United States Patent
Richards et al.

(10) Patent No.: US 10,659,739 B2
(45) Date of Patent: *May 19, 2020

(54) CONTROL OF LIGHT SPREADING WITH BLURRING ELEMENT IN PROJECTOR SYSTEMS

(71) Applicant: DOLBY LABORATORIES LICENSING CORPORATION, San Francisco, CA (US)

(72) Inventors: Martin J. Richards, Gig Harbor, WA (US); Nathan Shawn Wainwright, Plano, TX (US); Duane Scott Dewald, Dallas, TX (US); Barret Lippey, Foster City, CA (US); Brad Walker, Plano, TX (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/403,287

(22) Filed: May 3, 2019

(65) Prior Publication Data

US 2019/0260975 A1 Aug. 22, 2019

Related U.S. Application Data

(63) Continuation of application No. 15/574,017, filed as application No. PCT/US2016/031666 on May 10, 2016, now Pat. No. 10,326,967.

(Continued)

(51) Int. Cl.
*H04N 9/31* (2006.01)
*G03B 21/00* (2006.01)
(Continued)

(52) U.S. Cl.
CPC ......... *H04N 9/3126* (2013.01); *G03B 21/008* (2013.01); *H04N 5/72* (2013.01); *H04N 5/7458* (2013.01); *H04N 9/3123* (2013.01)

(58) Field of Classification Search
CPC .. G03B 21/005; G03B 21/006; G03B 21/208; G03B 21/2013; G03B 21/2053;
(Continued)

(56) References Cited

U.S. PATENT DOCUMENTS 6,594,090 B2 7/2003 Kruschwitz
7,551,341 B1 6/2009 Ward
(Continued)

FOREIGN PATENT DOCUMENTS

CN 102313244 1/2012
CN 103969933 8/2014
(Continued)

*Primary Examiner* — Sultan Chowdhury

(57) ABSTRACT

Projection systems and/or methods comprising a blurring element are disclosed. In one embodiment, a blurring element may comprise a first plate having a pattern on a first surface and second plate. The first plate and the second plate may comprise material having a slight difference in their respective index of refraction. In another embodiment, a blurring element may comprise a first plate having a pattern thereon and a second immersing material. The blurring element may be placed in between two modulators in a dual or multi-modulator projector system. The blurring element may be configured to give a desired shape to the light transmitted from a first modulator to a second modulator.

16 Claims, 9 Drawing Sheets

Related U.S. Application Data

(60) Provisional application No. 62/281,146, filed on Jan. 20, 2016, provisional application No. 62/162,587, filed on May 15, 2015.

(51) Int. Cl.
  *H04N 5/74* (2006.01)
  *H04N 5/72* (2006.01)

(58) Field of Classification Search
  CPC .. H04N 9/3105; H04N 9/3108; H04N 9/3123; H04N 9/3126
  See application file for complete search history.

(56) References Cited

U.S. PATENT DOCUMENTS

| | | |
|---|---|---|
| 7,789,548 B2 | 9/2010 | Chao |
| 8,125,702 B2 | 2/2012 | Ward |
| 8,313,198 B2 | 11/2012 | Kamijima |
| 8,403,484 B2 | 3/2013 | Bille |
| 8,801,189 B2 | 8/2014 | Mizushima |
| 8,860,640 B2 | 10/2014 | Perkins |
| 9,049,413 B2 | 6/2015 | Richards |
| 9,188,767 B2 | 11/2015 | Ito |
| 9,232,172 B2 | 1/2016 | Perkins |
| 2003/0039036 A1* | 2/2003 | Kruschwitz ........ G02B 27/0927 359/707 |
| 2004/0239822 A1 | 12/2004 | Kamijima et al. |
| 2006/0023164 A1 | 2/2006 | Sakaguchi |
| 2006/0082692 A1 | 4/2006 | Kamijima |
| 2008/0018808 A1* | 1/2008 | Seki ................ G03B 5/00 348/751 |
| 2009/0135490 A1 | 5/2009 | Lee |
| 2011/0227900 A1 | 9/2011 | Wallener |
| 2011/0279749 A1 | 11/2011 | Erinjippurath |
| 2012/0133689 A1 | 5/2012 | Kwong |
| 2012/0281111 A1* | 11/2012 | Jo ........................... H04N 5/217 348/229.1 |
| 2013/0106923 A1 | 5/2013 | Shields |
| 2013/0148037 A1 | 6/2013 | Whitehead |
| 2013/0194644 A1* | 8/2013 | Cable ................ G03H 1/2205 359/9 |
| 2014/0002514 A1 | 1/2014 | Richards |
| 2014/0063049 A1* | 3/2014 | Armstrong-Muntner .................... G03B 9/00 345/619 |
| 2014/0098351 A1* | 4/2014 | Read ................ G03B 21/2013 353/38 |
| 2014/0327710 A1 | 11/2014 | Xu |
| 2015/0124330 A1 | 5/2015 | Ito |
| 2015/0172609 A1 | 6/2015 | Otani |
| 2016/0286180 A1* | 9/2016 | Otani ................ H04N 9/3152 |

FOREIGN PATENT DOCUMENTS

| | | |
|---|---|---|
| DE | 627460 | 3/1936 |
| EP | 2128662 | 12/2009 |
| JP | 2006-251659 | 9/2006 |
| JP | 2009-042373 | 2/2009 |
| WO | 2010/031391 | 3/2010 |
| WO | 2014/183581 | 11/2014 |
| WO | 2015/023762 | 2/2015 |
| WO | 2015/054032 | 4/2015 |
| WO | 2015/066206 | 5/2015 |
| WO | 2016/108157 | 7/2016 |

* cited by examiner

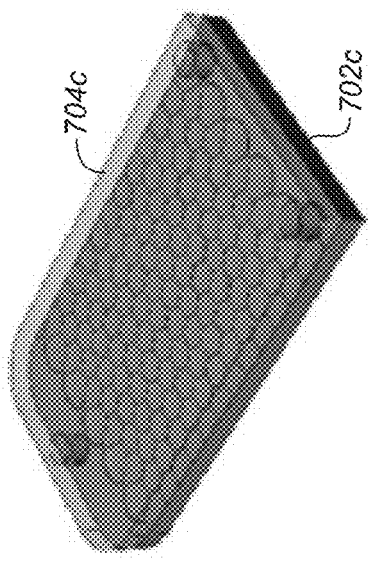
FIG. 7C-1
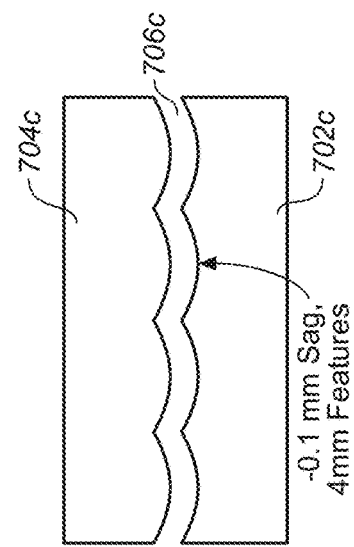
FIG. 7C-2
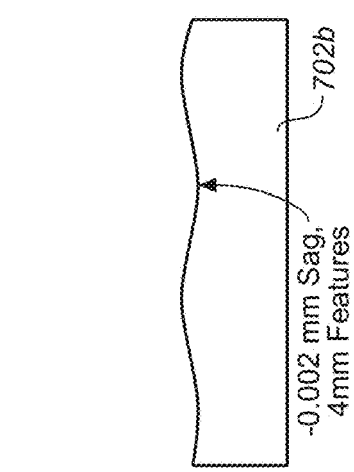
FIG. 7B-1
FIG. 7B-2
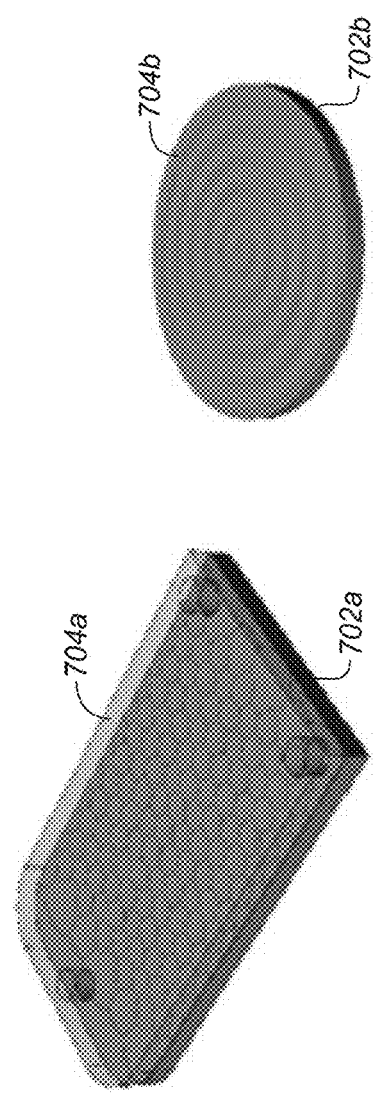
FIG. 7A-1
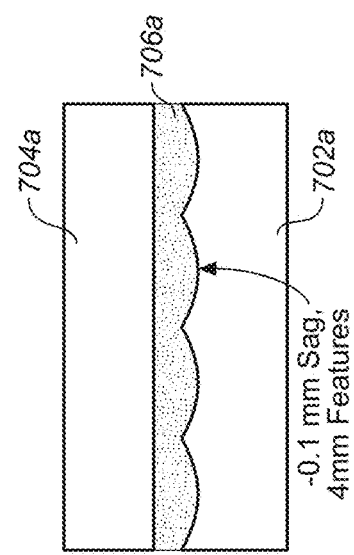
FIG. 7A-2

CONTROL OF LIGHT SPREADING WITH BLURRING ELEMENT IN PROJECTOR SYSTEMS

CROSS-REFERENCE TO RELATED APPLICATIONS

This application is a continuation of U.S. patent application Ser. No. 15/574,017 filed Nov. 14, 2017 which is the U.S. national stage of PCT/US2016/031666 filed May 10, 2016 which claims priority from U.S. Provisional Patent Application No. 62/162,587 filed 15 May 2015 and U.S. Provisional Patent Application No. 62/281,146 filed Jan. 20, 2016, which are hereby incorporated by reference in their entirety.

TECHNICAL FIELD

The present invention relates to projector systems and, particularly, to systems and methods for control of light spreading in High Dynamic Range (HDR) projection systems.

BACKGROUND

Projector systems are now being architected with improvements in dynamic range. Dual and multi-modulator projector display systems are known in the art. However, additional improvements are possible in both the rendering and the performance of such display systems resulting from improved modeling of the light processing in such display systems. In addition, as appreciated by the inventors, it would be desirable to improve the imaging of dual/multi-modulation display systems—e.g., by improving the shape of the point spread function of light coming from an upstream modulator.

In some embodiments of dual/multi modulator projector systems, a first (or earlier) modulator may illuminate portions of a second (or later) modulator—e.g., where the second/later modulator may further refine the image in order to ultimately project a final image. It may be desirable to control light from the first/earlier modulator to produce a desired spread of light illumination onto the second/later modulator.

SUMMARY

Projection systems and/or methods comprising a blurring element are disclosed In one embodiment, a blurring element may comprise a first plate having a pattern on a first surface and second plate. The first plate and the second plate may comprise material having a slight difference in their respective index of refraction. In another embodiment, a blurring element may comprise a first plate having a pattern thereon and a second immersing material. The blurring element may be placed in between two modulators in a dual or multi-modulator projector system. The blurring element may be configured to give a desired shape to the light transmitted from a first modulator to a second modulator.

In one embodiment, a blurring element comprises a first plate, said first plate comprising a first transmissive material, the first transmissive material comprising a first surface, and said first surface comprising an interface pattern; and a second plate, said second plate comprising a second transmissive material comprising a second surface, the second surface in optical communication with the first surface.

A blurring element comprises: a first plate, said first plate comprising a first transmissive material, the first transmissive material comprising a first surface, and said first surface comprising an interface pattern; and a second immersing material, said second immersing material comprising a second transmissive material comprising a second surface, the second surface in optical communication with the first surface.

In another embodiment, a projector display system comprises: a light source; a first modulator, the first modulator configured to receive the light from the light source and modulate the light into a plurality of light spots; a blurring element, the blurring element comprising a desired amount of diffusion to shape a set of said light spots into a set of desired shaped spots; a second modulator, the second modulator configured to receive and modulate the set of desired shaped spots; a controller, the controller configured to receive image data and send control signals to the first modulator and the second modulator.

Other features and advantages of the present system are presented below in the Detailed Description when read in connection with the drawings presented within this application.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

FIGS. 7A-1 and 7A-2 depict one possible embodiment of a blurring element in perspective view and cross-sectional view, respectively.

FIGS. 7B-1 and 7B-2 depict another possible embodiment of a blurring element in perspective view and cross-sectional view, respectively.

FIGS. 7C-1 and 7C-2 depict yet another possible embodiment of a blurring element in perspective view and cross-sectional view, respectively.

DETAILED DESCRIPTION

Figure 1:
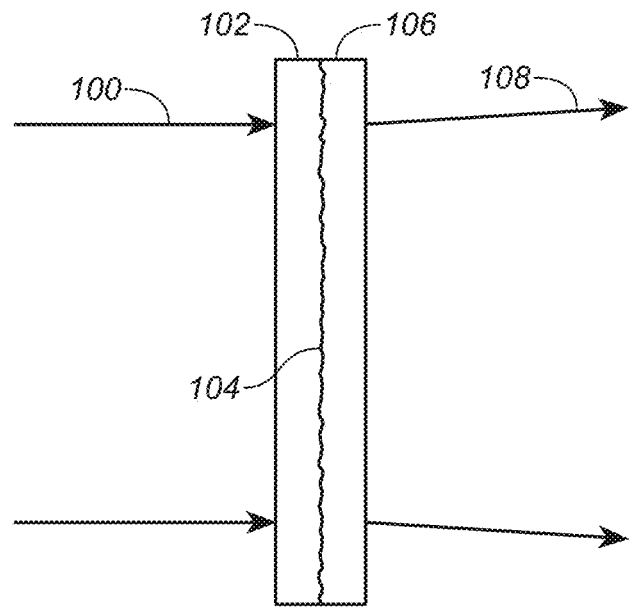
FIG. 1 depicts a blurring element with a substantially random surface as made in accordance with the principles of the present application.

As utilized herein, terms "component," "system," "interface," and the like are intended to refer to a computer-related entity (when the context of the discussion is computer-related in nature), either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers. A component may also be intended to refer to a communications-related entity, either hardware, software (e.g., in execution), and/or firmware and may further comprise sufficient wired or wireless hardware to affect communications.

Throughout the following description, specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Introduction

In the field of projector and other display systems, it is desirable to improve both image rendering performance and system efficiency. Several embodiments of the present application describe systems, method and techniques to affect these improvements by employing light field modeling for dual, or multi-modulation display systems. In one embodiment, light source models are developed and used to advantageous effect. Camera pictures of displayed images of known input images may be evaluated to improve light models. In some embodiments, an iterative process may accumulate improvements. In some embodiments, these techniques may be used on moving images to make live adjustments to improve image rendering performance.

Dual modulation projector and display systems have been described in commonly-owned patents and patent applications, including:

(1) U.S. Pat. No. 8,125,702 to Ward et al., issued on Feb. 28, 2012 and entitled "SERIAL MODULATION DISPLAY HAVING BINARY LIGHT MODULATION STAGE";

(2) United States Patent Application 20130148037 to Whitehead et al., published on Jun. 13, 2013 and entitled "PROJECTION DISPLAYS";

(3) United States Patent Application 20110227900 to Wallener, published on Sep. 22, 2011 and entitled "CUSTOM PSFs USING CLUSTERED LIGHT SOURCES";

(4) United States Patent Application 20130106923 to Shields et al., published on May 2, 2013 and entitled "SYSTEMS AND METHODS FOR ACCURATELY REPRESENTING HIGH CONTRAST IMAGERY ON HIGH DYNAMIC RANGE DISPLAY SYSTEMS";

(5) United States Patent Application 20110279749 to Erinjippurath et al., published on Nov. 17, 2011 and entitled "HIGH DYNAMIC RANGE DISPLAYS USING FILTERLESS LCD(S) FOR INCREASING CONTRAST AND RESOLUTION" and (6) United States Patent Application 20120133689 to Kwong, published on May 31, 2012 and entitled "REFLECTORS WITH SPATIALLY VARYING REFLECTANCE/ABSORPTION GRADIENTS FOR COLOR AND LUMINANCE COMPENSATION".

all of which are hereby incorporated by reference in their entirety.

One Exemplary Physical Architecture

In general, a projector with a single Digital Micromirror Device (DMD) may tend to have a limited contrast ratio. To obtain a greater contrast ratio, two or more DMDs and/or other reflectors (e.g., MEMS) may be arranged in series. As a DMD may operate as a time-division or pulse-width modulator, operating two or more DMDs and/or reflectors in series—both acting as pulse-width modulators—tends to require precise time-division alignment and pixel-to-pixel correspondence of time-division sequencing. Such alignment and correspondence requirements may be difficult in practice. Thus, in many embodiments of the present application, projector and/or display systems may employ different dual-modulation schemes to affect the desired performance.

Figure 3:
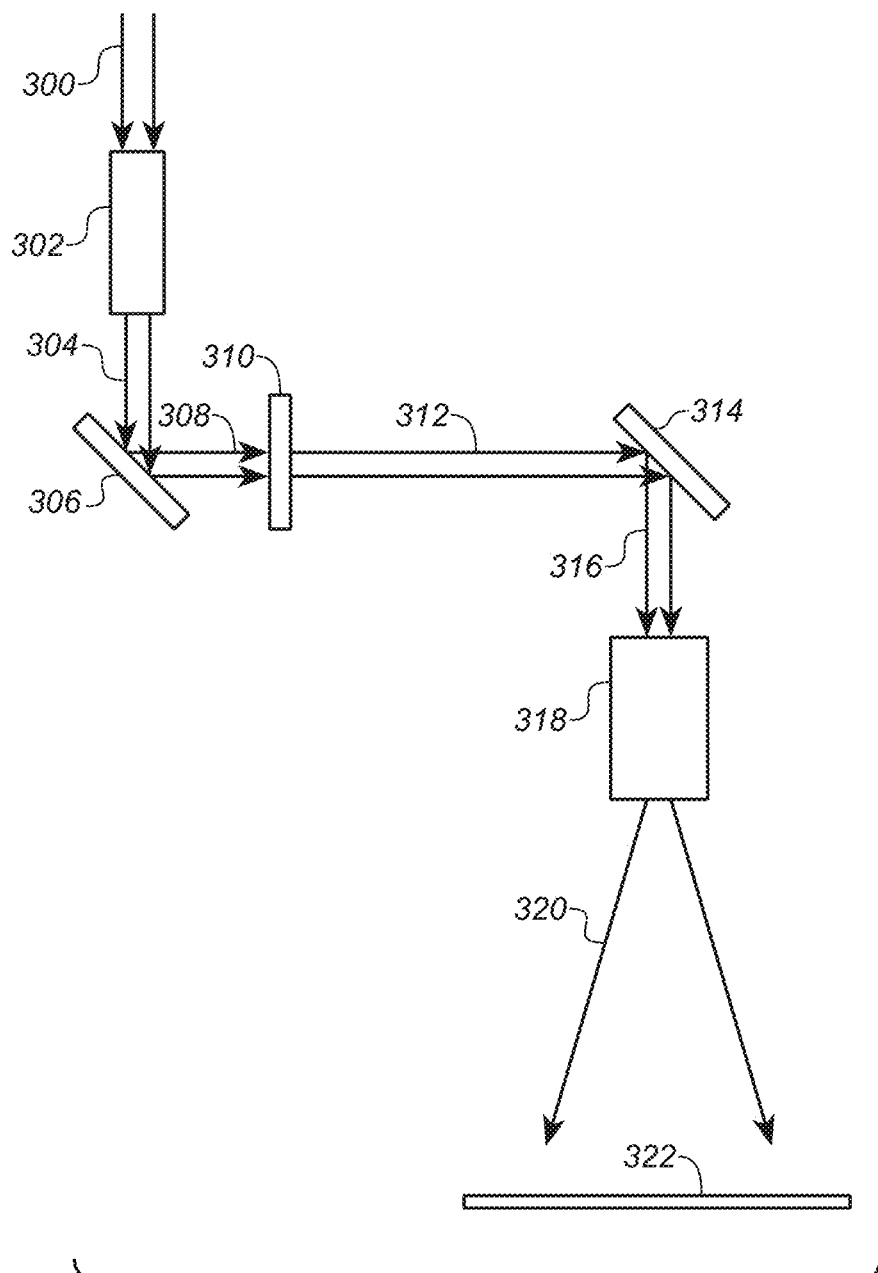
FIG. 3 shows one possible embodiment of a dual modulator projector display system suitable for the purposes of the present application.

For merely one example, FIG. 3 shows one embodiment of a projector display system that comprises: light 300 (e.g. from a light source—e.g., an array of individually controllable LEDs, lamps, partially coherent light sources, or any light source known in the art), an integrating rod 302 (e.g., that may be used for light recycling purposes, send light 304 further downstream), a first modulator 306 (e.g., a first DMD/modulator) as a "pre-modulator" or "premod"—that may spatially modulate light 304 by means of a halftone image that may be maintained for a desired period of time (e.g., a frame or a portion thereof) to produce intermediate light 308.

Light 308 may illuminate a blurring element 310, as will be discussed in detail herein. Blurring element 310 may blur this halftone image to create a spatially-reduced-bandwidth light field 312 that may be applied to a second DMD/modulator 314. The second DMD/modulator—referred to as the primary modulator—may further process this light— e.g., pulse-width modulate the blurred light field. This arrangement may tend to avoid both requirements mentioned above—e.g., the precise time-division alignment and/or the pixel-to-pixel correspondence. In some embodiments, the two or more DMDs/modulator may be frame-aligned in time, and approximately spatially frame-aligned. In some embodiments, the blurred light field from the premod DMD/modulator may substantially overlap the primary DMD/modulator. In other embodiments, the spatial alignment may be known and accounted for—e.g., to aid in image rendering performance. Light 316 from the second modulator may be input into other optical components 318 to further process the light 316 for final projection light 320 onto viewing screen 322.

It will be appreciated that several components of the projector system may be under control of a controller/processor, in communication with computer-readable media (e.g., RAM, ROM, DVD, CD, flash memory or the like) that stores computer readable instructions that cause the processor to read input image/video data, process that data, send control signals to various components (e.g., light sources, first modulator, second modulator, other modulators) to form a desired projected image, as is known in the art. The controller may receive video/image data and sent control signals to control the light source(s), the first modulator, the second modulator, the blurring element (if there is an actuator or motor control)—e.g., to form the final projected images/video.

In other embodiments, there may be lenses and other optical elements in the light path throughout the projector system—e.g., in light path 304, 308, 312, 316 and/or 320. Such other optical elements and/or lenses may be used in combination with the blurring element to provide desired shaping to the light spots that may be transmitted by first modulator 306.

While the present application is presented in the context of a dual, multi-modulation projection system, it should be appreciated that the techniques and methods of the present application will find application in single modulation, or other dual, multi-modulation display systems. For example, a dual modulation display system comprising a backlight, a first modulator (e.g., LCD or the like), and a second modulator (e.g., LCD or the like) may employ suitable blurring optical components and image processing methods and techniques to affect the performance and efficiencies discussed herein in the context of the projection systems.

It should also be appreciated that—even though FIG. 3 depicts a two-stage or dual modulator display system—the methods and techniques of the present application may also find application in a display system with only one modulator or a display system with three or more modulator (multi-modulator) display systems. The scope of the present application encompasses these various alternative embodiments.

Blurring Element Embodiments

As mentioned above, a blurring element may be introduced into the light path in a projector display system. As will be discussed further herein, a blurring element may provide a desired amount of spreading of the light for various reasons—e.g., to provide a desired light spot shape. In one embodiment, the blurring element may provide a substantially Gaussian light spot shape coming from the first modulator to illuminate a portion of the second modulator.

In many embodiments, the blurring element 310 may be a diffuser, a lenslet array, phase plate or a diffuser having certain characteristics in its light shaping ability. The blurring element may include a immersed optical components such as an immersed lenslet array or immersed diffuser. FIG. 1 shows one embodiment of such a component 310. In this embodiment, two plates 102 and 106 may be mechanically mated together by an epoxy or adhesive. In this embodiment, the interface 104 between the two plates 102 and 106 may be a substantially irregular surface. The irregular surface may be machined and/or etched to provide a certain amount of diffusion of the light 100 being transmitted through component 310—e.g., light 108 having a desired amount of diffusion to affect substantially a Gaussian Point Spread Function (PSF) curve for the light transmitted (e.g., to a second modulator).

In one embodiment, the two plates (102 and 106) may be of the same material (e.g., glass, plastic or some other transmissive/translucent material). It may be desired to have the two plates to comprise materials with a slight difference in their respective index of refraction. For example, the difference of the index of refraction may be on the order of 0.01 (e.g., in the range of 0.1 to less than 0.01). This would compare, in distinction, with the difference of index of refraction between a material and air—e.g., typically on the order of 0.5 difference in index of refraction. Such a design of a component 310 where the diffusion is primarily occurring at a surface between two materials would be called an "immersed" design.

Figure 10:
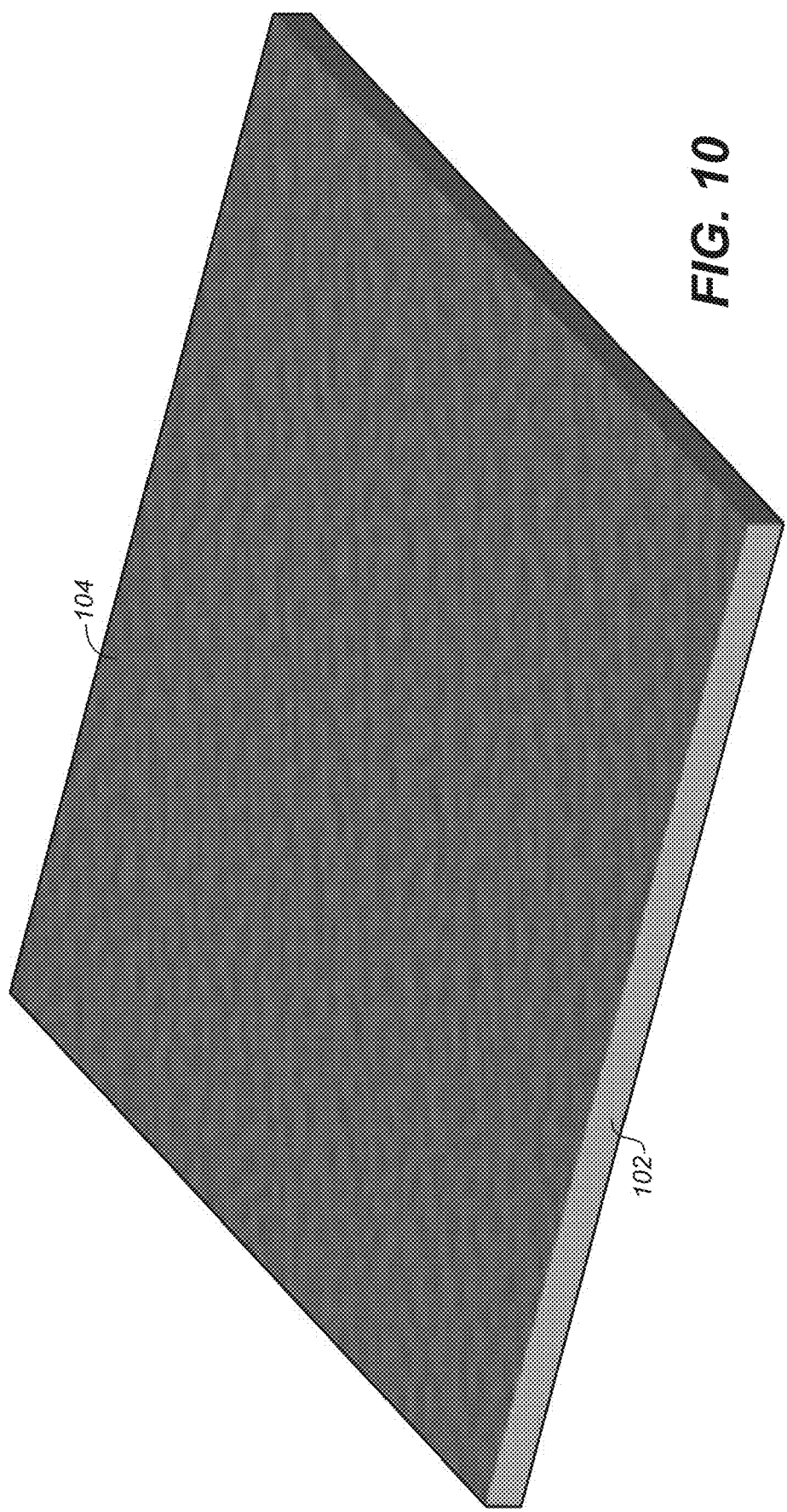
FIG. 10 depicts one alternative embodiment of a blurring element having a somewhat randomized surface variation thereof.

Returning to the embodiment of FIG. 1, the diffusing/diffusive surface 104 is immersed between the two plates 102 and 106 of slightly different indexes of refraction. As mentioned, in this embodiment, the surface 104 is substantially irregular. FIG. 10 is a perspective view of a portion of the blurring element. As may be seen, one plate (e.g. 102) may be machined and/or etched to affect a substantially irregular surface/interface 104. To complete the blurring element, the blurring element may be coated and/or encapsulated with an epoxy—or may be mated to another plate (e.g., 106—not shown in FIG. 10)—to complete the blurring element in an immersed design.

It will be appreciated that while many of the embodiments herein are of the immersed design, it may be possible to create a surface of desired variance such that an air interface may give the desired amount of diffusion to effect a desired PSF shaped light spot.

Figure 2:
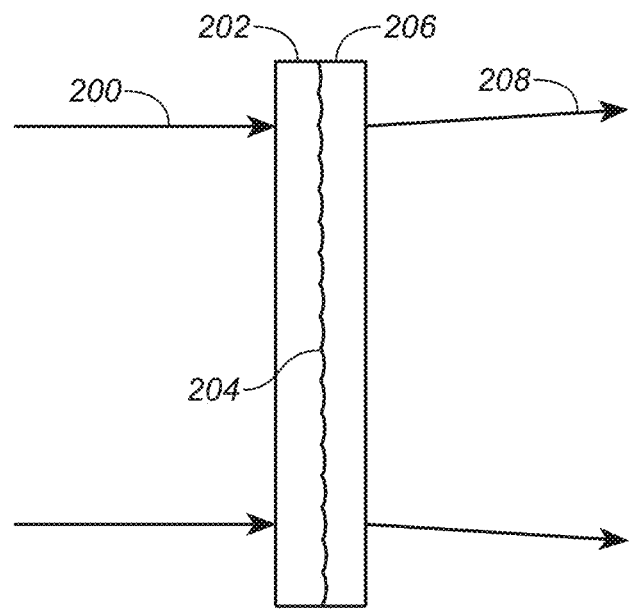
FIG. 2 depicts a blurring element with a substantially regular surface as made in accordance with the principles of the present application

FIG. 2 is yet another embodiment of component 310 wherein two plates 202, 206 are machined, etched and/or patterned in a more regular matching interface 204—again, with the desired effect of receiving light 200 and producing a desired amount of diffusion in output light 208. It should be appreciated that in some embodiments, the component 310 might comprise one plate in an immersing medium. Additionally, in other embodiments, component 310 may comprise two or more plates—possibly with an immersing medium and/or epoxy or some other adhesive or attachment (e.g., bolts, screws, solder or the like).

Figure 4:
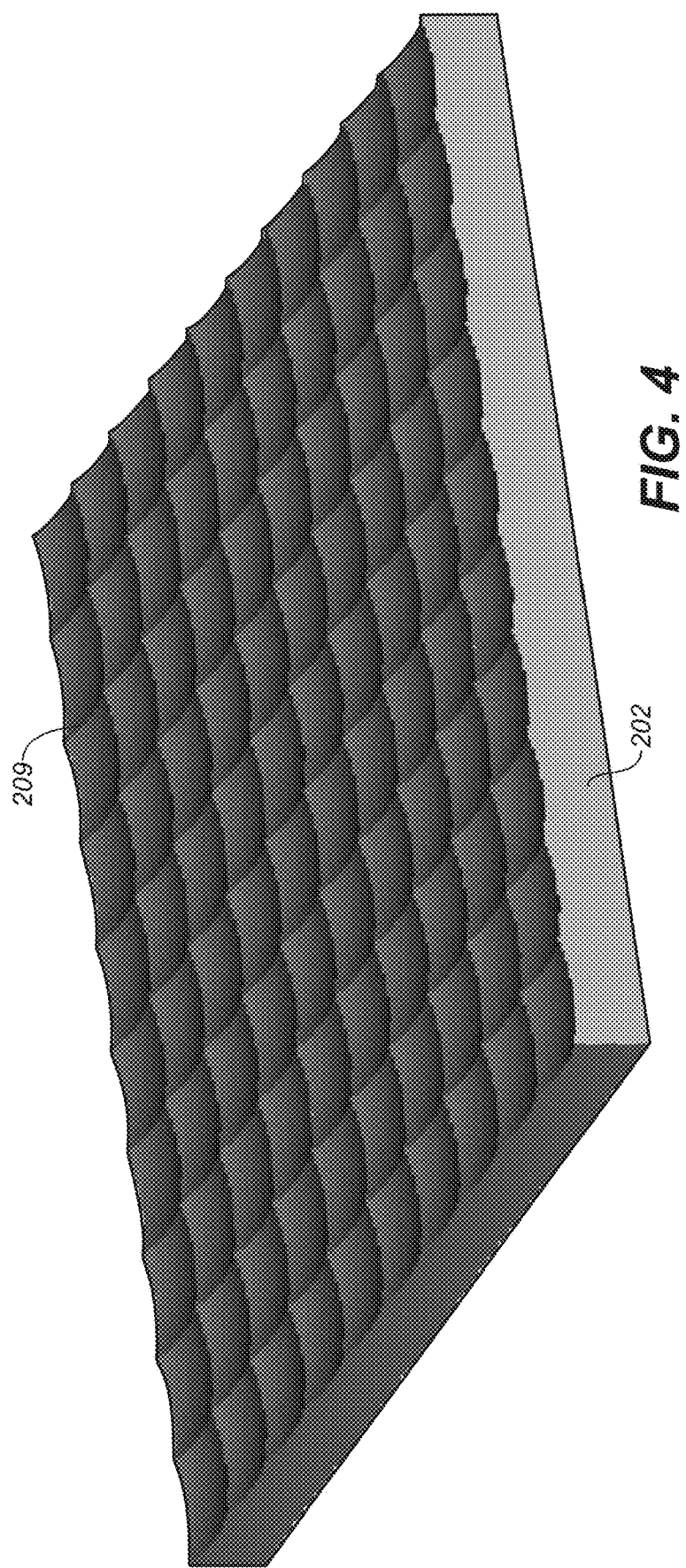
FIG. 4 depicts one embodiment of a blurring element made in accordance with the principles of the present application.

The substantially regular interface pattern may take many different configurations. FIG. 4 is a perspective view of a partial plate in FIG. 2—and shows one possible configuration embodiment of a pattern suitable for the purposes of the present application. As may be seen, plate 202 may be patterned with a set of concave features 204 to form the surface interface. As shown, the shape of the features may be substantially square, rectangular and/or quadrilateral. In other embodiments, other features shapes may be possible—e.g., hexagonal, other polygons, circular, or any other shapes.

In addition, while the features of plate 202 in FIG. 4 are shown as primarily concave (e.g., from machining, etching or the like), it will be appreciated that the features may be convex (e.g., from some form of manufacturing, deposition, formation or the like).

In another embodiment, the surface may comprise a set of rectangular toroidal lenses with substantially the same radius of curvature in the x and y directions. The size of each lenslet may be on the order of 1 mm. In addition, the curvature may be in the range of 10 to 100 mm.

Figure 5:
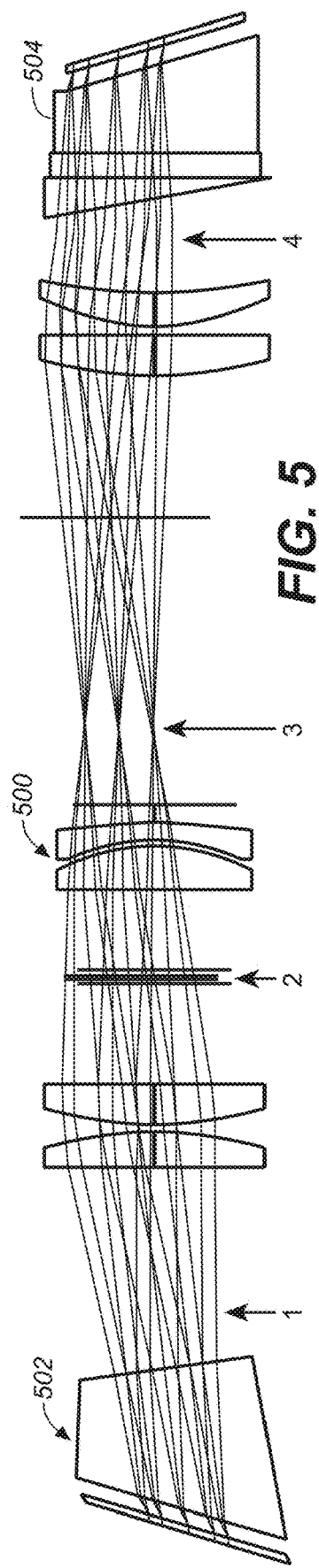
FIG. 5 depicts yet another embodiment of a projector system made in accordance with the principles of the present application.

As previously mentioned, the blurring element and/or component 310 may be placed at various points in the optical path. For example, FIG. 5 shows one embodiment of a suitable optical system 500 for a projector system suitable for the purposes of the present application. System 500 may comprise a first modulator 502, some intermediate optical components (as shown) and a second modulator 504. The arrows designated as "1", "2", "3" and "4" are all suitable places within the optical system where a blurring element may be placed in order to affect the desired amount of diffusion—e.g., to affect a desired PSF curve for light spots formed on the second modulator 504. It should be appreciated that a suitable blurring element may be placed within the system at other points in the optical pathway.

Figure 6:
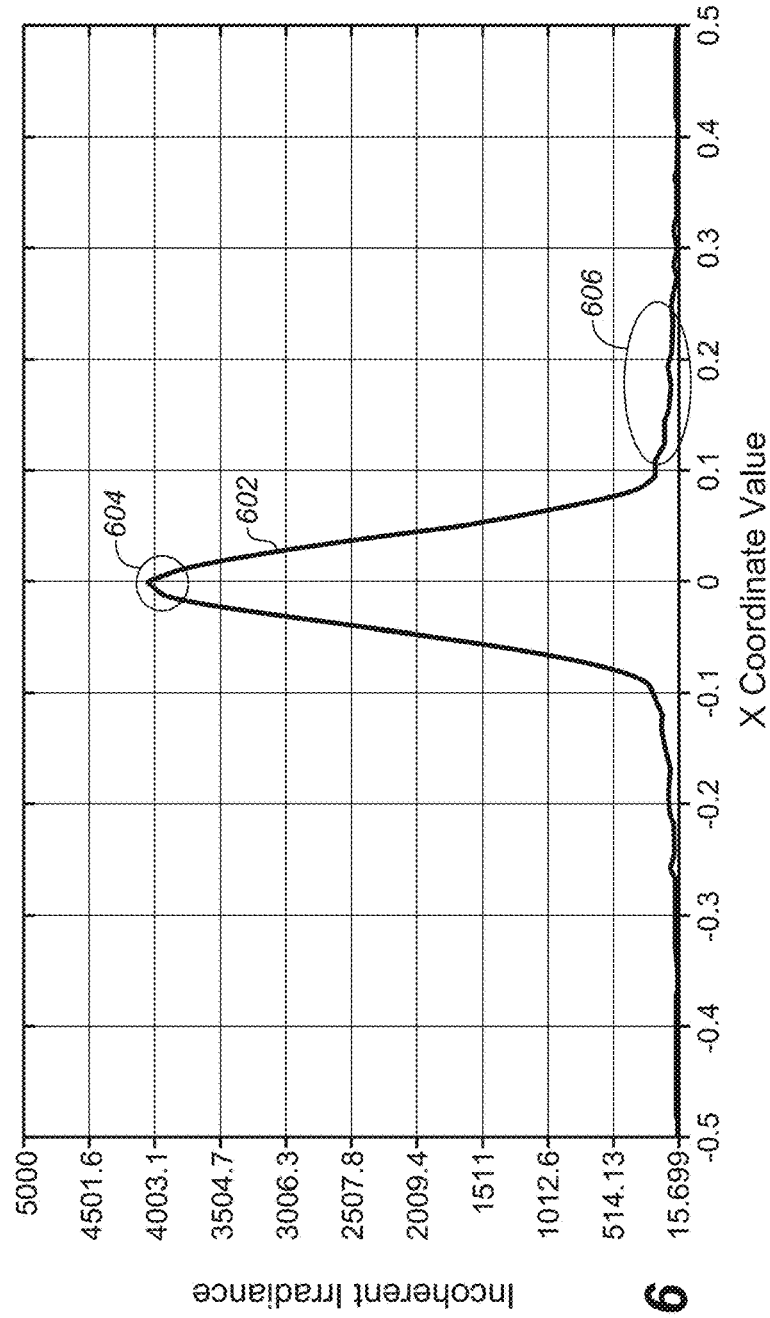
FIG. 6 depicts a possible point spread function of the light as potentially produced at the second/later modulator.

FIG. 6 is one example of a possible PSF shape of a light spot produced by one of the embodiments of a blurring element described herein. PSF curve 602 may be substantially Gaussian shaped, as shown. Of course, curve 602 may exhibit features that are not precisely Gaussian. For example, curve 602 exhibits a peaked feature 604—in addition, the base region 606 may exhibit ripple features that also deviate from an ideal Gaussian spot. These features may be desirable over time and during the course of operation.

Other Embodiments

FIGS. 7A-1, 7B-1 and 7C-1 depicted other possible embodiments of blurring element that may be suitable for the purposes of the present application. FIGS. 7A-2, 7B-2 and 7C-2 depict cross-section views of the FIGS. 7A-1, 7B-1 and 7C-1, as will be described herein.

The blurring element of FIG. 7A-1 may comprise a plate 702a having concave (or convex) features in whatever shape desired (e.g., hexagonal, polygonal or the like). As seen in FIG. 7A-2, another plate 704a may be mated to plate 702a by an epoxy and/or suitable adhesive 706a. Plate 704a may have a flat surface to match the surface of plate 702a. In one embodiment, the features may have a desired sagittal amount (e.g., −0.1 mm as shown—or any other sagittal). In one embodiment, the horizontal dimension may be of a desired length (e.g., 4 mm as shown—or any other desired amount).

FIG. 7B-1 may be a blurring element that comprises substantially concentric circular features as shown. FIG. 7B-2 shows possible dimensions—and plate 702b may be matched with a substantially flat plate (not shown) as in FIG. 7A-2. Alternatively, plate 702b may be passivated, coated and/or encapsulated by an epoxy, adhesive layer or the like (e.g., 704b). Of course, all embodiments herein may comprise such a layer—or not—as desired.

FIG. 7C-1 depicts one embodiment of a blurring element that may comprise a plate 702c with concave features to be geometrically matched with a plate 704c with convex features, as shown. These plates may be mated by an epoxy, adhesive or the like as layer 706c, if desired.

Figure 8A:
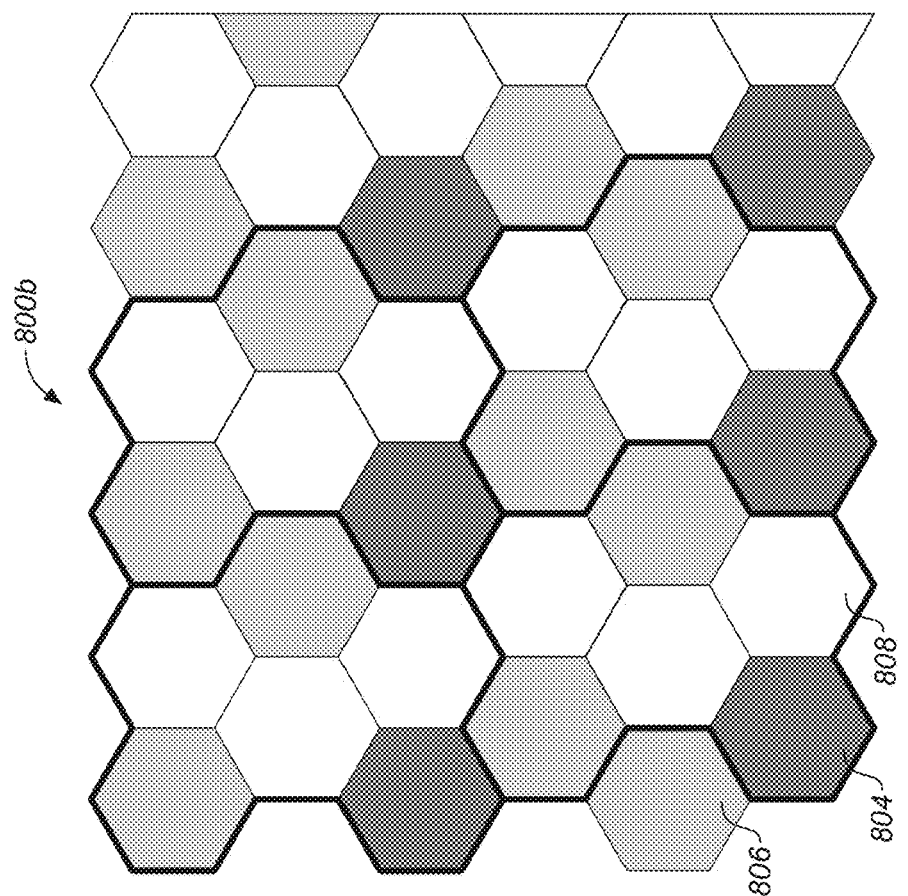
FIGS. 8A and 8B depict two possible embodiments of blurring elements comprising various patterns of surface features as made in accordance with the principles of the present application.
Figure 8B:
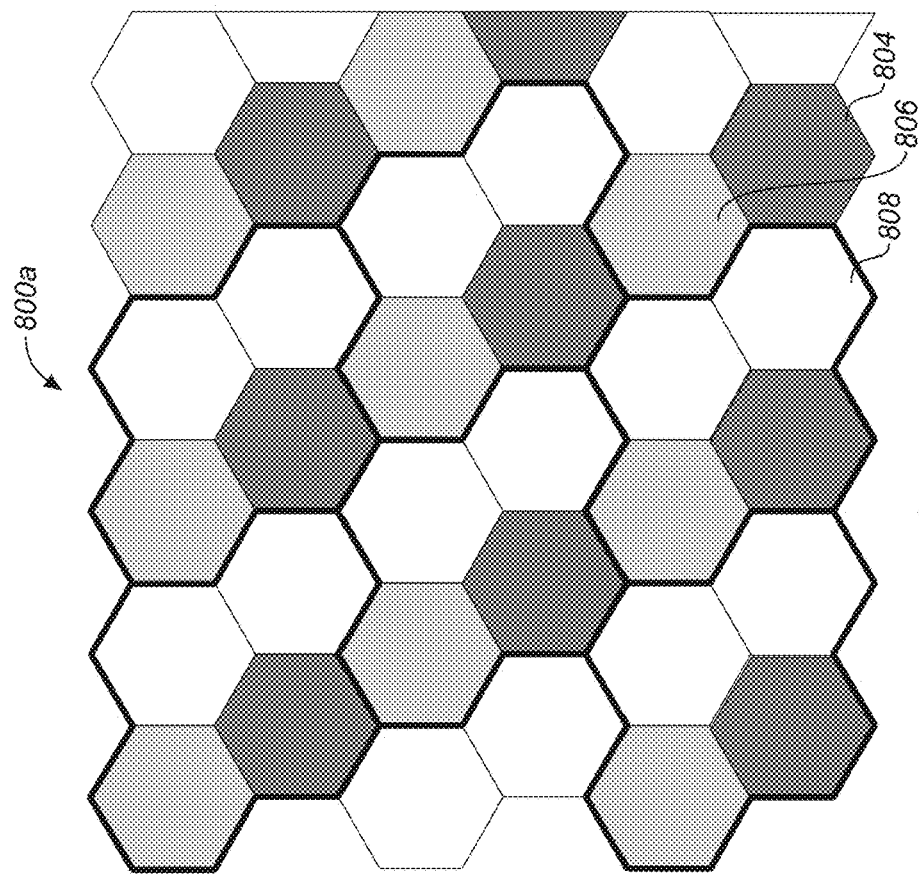

FIGS. 8A and 8B are yet other embodiments of blurring elements 800a and 800b respectively. In these embodiments, features may be made of differing dimensions and designs—e.g., for the purpose of increasing the randomness of the diffusion and/or improving the shape of the spot to assume a more Gaussian shape.

For example, in FIGS. 8A and 8B, it may be desired to machine, etch and/or pattern with varying sagittal dimensions. One embodiment may have a first, deep sagittal dimension 804, a second, medium sagittal dimension 806 and a third, slight sagittal dimension 808. It should be appreciated that other dimensions may be possible and/or desired—as well as other feature dimensions (e.g., horizontal) may be varied similarly. As may also be seen, such varied features may be placed on the plate in an array fashion and/or hex pattern. Other patterns of feature placement may be possible and/or desired.

Spline-Generated Embodiments

Figure 9A:
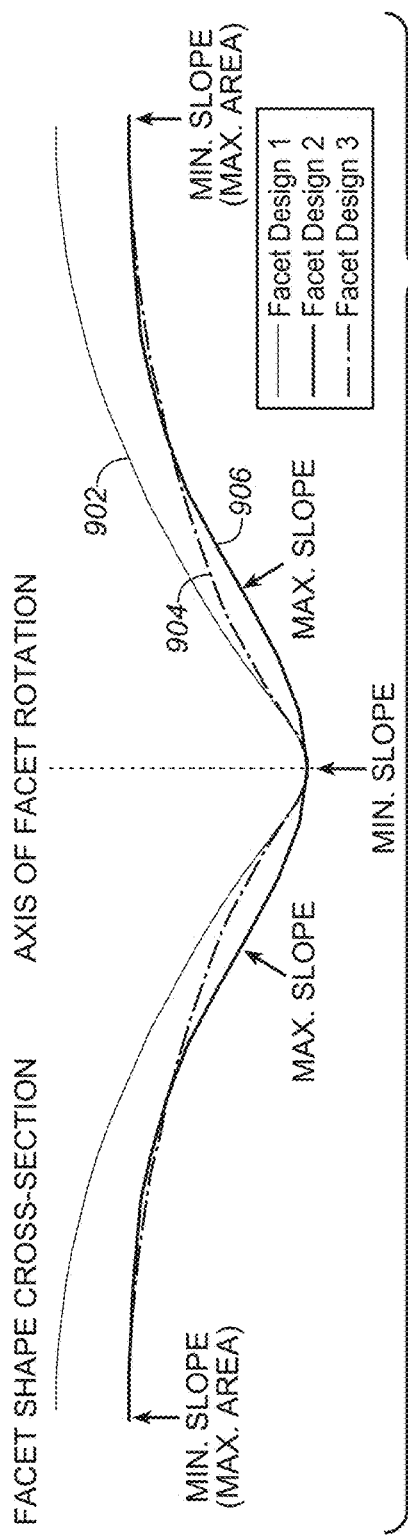
FIGS. 9A and 9B depict possible shapes of concave features and their associated calculated point spread functions, respectively.
Figure 9B:
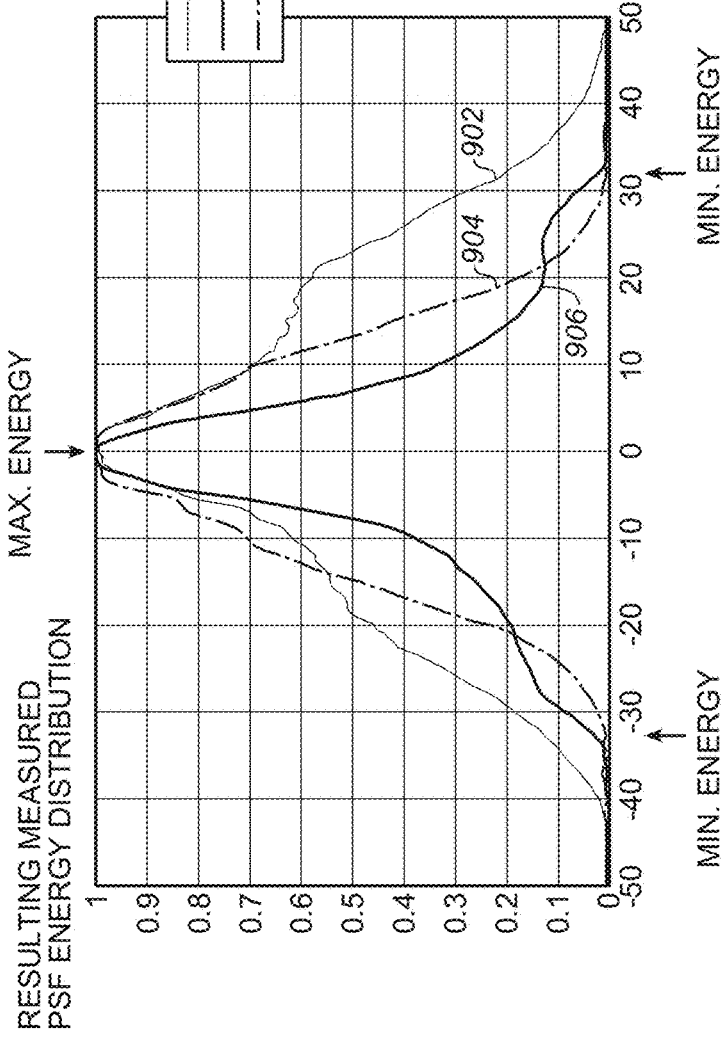

FIG. 9A depicts three possible feature shapes (902, 904 and 906) and/or facet designs—hile FIG. 9B depicts the corresponding estimated PSF shapes 908, 910 and 912 respectively.

As may be seen, for facet design 902, the feature design comprises the greatest amount of variation—while designs 904 and 906 are designs comprising lesser amounts of variation.

As may be seen, the PSF shapes 908, 910 and 912 are shown in FIG. 9B. Each PSF shape represents some deviation from an ideal Gaussian shape. For example Facet design 906 has a gradual slope that results in PSF shape 912 that is narrower than the target Gaussian shape. Facet design 902 has higher slopes that result in broader PSF shape 908, but still not matching the target Gaussian shape because it has a narrower peak at the top and broader shoulders at the bottom. Facet design 904 is constructed with spline fits that are between facet design 902 and 906.

Other Embodiments

As creating a substantially random diffusion may be desired to mimic an ideal Gaussian, other embodiments of the present system may comprise some mechanical motor to produce some motion or oscillation in the blurring element during imaging operation. For example, the blurring element may be made to rotate—or at least oscillate—so that any regular pattern for manufactured features do not show static structure on the PSF shapes as images are being projected through the system. In addition, a combination of lens adjustment and blurring element may also allow for the desired amount of PSF tuning for a desired shaped spot.

For these and other embodiments herein, the present use of a blurring element and/or PSF shaping diffusion may be employed to. (1) avoid thermal drift, alignment changes, or other changes in time, (2) avoid the problem of making a standard diffuser with very small diffusion angles and Gaussian PSF, and (3) potentially easier PSF tuning by swapping out known blurring elements with different amounts of spreading.

Figure 11:
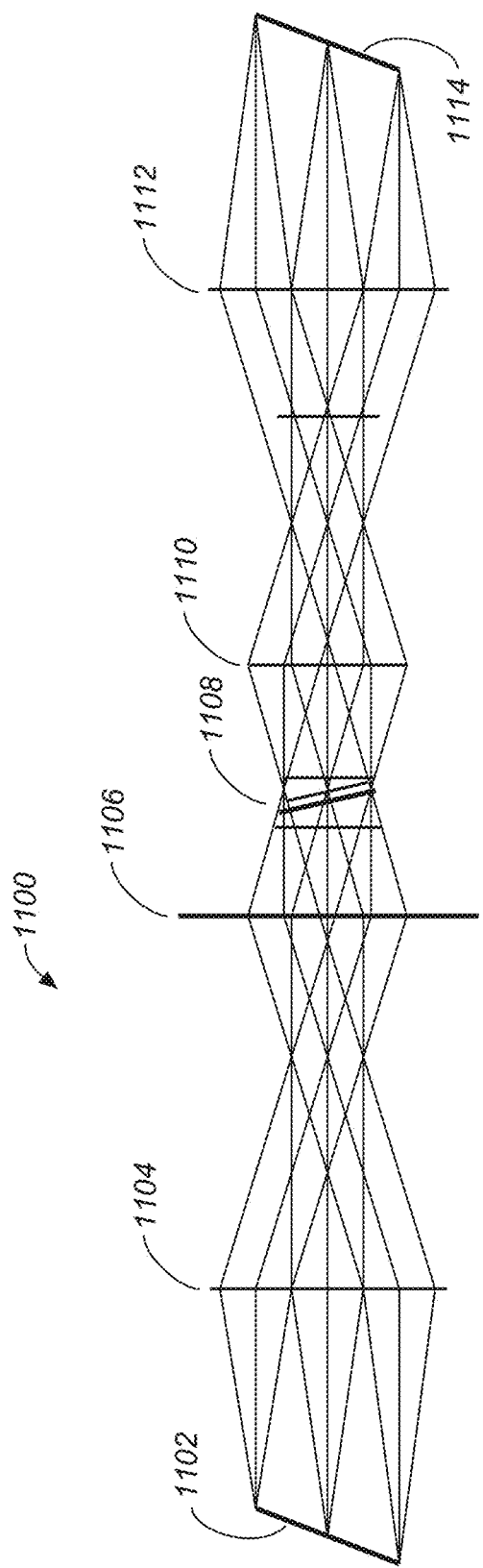
FIG. 11 depicts yet another embodiment of a projector system made in accordance with the principles of the present application.

FIG. 11 is an alternative embodiment to the optical system, similar to that shown in FIG. 5. FIG. 11 incorporates an intermediate image plane where the modulators are imaged in free space—which also allows a blurring element to be located near an image plane.

For example, if a blurring element (i.e., the thick diagonal line shown at or near 1108) is placed near this image plane, then a conventional easy to manufacture diffuser could be used for the blurring element rather than the rather esoteric element needed without the intermediate image plane. The size of the PSF can be adjusted by moving the diffuser closer or further from the intermediate image plane, and the imaging system 1100 does not need to have an offset focus and a known spherical aberration at the offset focal position. The foptical system of FIG. 11 may comprise: First modulator 1102 (e.g., DLP), lenses 1104, 1106 (forming intermediate image plane 1108, which may be telecentric). The thin diagonal line (near 1108) is the intermediate image plane. Lenses 1110 and 1112 form another (possibly, telecentric) imaging system that images the intermediate image plane onto modulator 1114.

This embodiment may employ a more complex relay imaging optical system, since the first modulator is imaged two times rather than just once. However, using the blurring element at the intermediate allows an image system with potentially less stringent requirements, such that it becomes practical without resorting to using double the number of elements of a single relay system. There is often times no need for a focus offset, and the aberrations may be minimized at focus like a conventional optical system.

A detailed description of one or more embodiments of the invention, read along with accompanying figures, that illustrate the principles of the invention has now been given. It is to be appreciated that the invention is described in connection with such embodiments, but the invention is not limited to any embodiment. The scope of the invention is limited only by the claims and the invention encompasses numerous alternatives, modifications and equivalents. Numerous specific details have been set forth in this description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The invention claimed is:

1. A display, comprising: a light source; a first modulator configured to receive light from the light source and modulate the light into a first light; a blurring element configured to diffuse the first light into a second light; a motor mechanically coupled to the blurring element and configured to move the blurring element during operation of the display and further wherein the motor is configured to rotate or oscillate the blurring element during the operation of the display so that regular patterns for features of the blurring element do not show static structures on PSF shapes of images being projected; and a second modulator configure to receive and modulate the second light.

2. The display of claim 1, wherein the motor is configured to rotate or oscillate the blurring element during the operation of the display.

3. The display of claim 1, wherein the first light is associated with a first point spread function (PSF) and the second light is associated with a second PSF different from the first PSF.

4. The display of claim 1, wherein the blurring element comprises a surface comprising concave or convex features.

5. The display of claim 1, wherein the blurring element comprises:
   a first plate comprising a first transmissive material, the first transmissive material comprising a first surface, and the first surface comprising an interface pattern; and
   a second plate comprising a second transmissive material, the second transmissive material comprising a second surface, the second surface in optical communication with the first surface.

6. The display of claim 5, wherein an interface between the first plate and the second plate is substantially irregular.

7. The display of claim 5, wherein the interface pattern of the first plate comprises a set of concave features.

8. The display of claim 3, wherein the light associated with the second PSF forms substantially Gaussian light spots on the second modulator.

9. The display of claim 3, wherein the blurring element is configured to diffuse the light associated with the first PSF and generate the light associated with the second PSF having the second shape that is substantially Gaussian.

10. The display of claim 9, wherein the substantially Gaussian second shape of the second PSF comprises a peaked feature or a base region comprising ripple features.

11. A display method, comprising:
   emitting light propagating along a light path, by a light source;
   modulating the light from the light source, by a first modulator, to cause the light to form light spots having a set of first shapes on a second modulator;
   rotating a blurring element; diffusing the light propagating along the light path, by the blurring element, wherein a combination of the modulation by the first modulator and the diffusion by the blurring element changes respective shapes of the light spots to a set of second shapes different from the set of first shapes; and
   receiving and modulating, by the second modulator, the light spots having the set of second shapes.

12. The display method of claim 11, wherein the blurring element is rotated so that regular patterns for features of the blurring element do not show static structures on PSF shapes of images being displayed.

13. The display method of claim 11, wherein the blurring element comprises:
   a first plate comprising a first transmissive material, the first transmissive material comprising a first surface, and the first surface comprising an interface pattern; and
   a second plate comprising a second transmissive material, the second transmissive material comprising a second surface, the second surface in optical communication with the first surface.

14. The display method of claim 13, wherein an interface between the first plate and the second plate is substantially irregular.

15. The display method of claim 13, wherein the set of second shapes of the light spots received by the second modulator are substantially Gaussian.

16. The display method of claim 11, wherein the blurring element comprises a surface comprising concave or convex features.

* * * * *